Oct. 19, 1971  J. R. COLSTON  3,613,369
TURBINE SPEED CONTROL
Original Filed July 5, 1963  2 Sheets-Sheet 1

INVENTOR
JOHN R. COLSTON
BY Hurvitz, Rose & Greene
ATTORNEYS

Oct. 19, 1971 J. R. COLSTON 3,613,369
TURBINE SPEED CONTROL

Original Filed July 5, 1963　　　　　　　　　　2 Sheets-Sheet 2

INVENTOR
JOHN R. COLSTON

BY *Hurvitz, Rose & Greene*

ATTORNEYS 3,613,369
TURBINE SPEED CONTROL
John R. Colston, Monroeville, Pa., assignor to Bowles
Fluidic Corporation, Silver Spring, Md.
Original application July 5, 1963, Ser. No. 293,108.
Divided and this application Aug. 19, 1966, Ser.
No. 573,661
Int. Cl. F01k 13/00
U.S. Cl. 60—105                                        21 Claims

ABSTRACT OF THE DISCLOSURE

A fluid control system generates a first fluid signal having a frequency component which varies as a function of a parameter of a device to be controlled, and a second fluid signal having a fixed frequency, the fluid signals are combined to produce a further fluid signal whose frequency varies as a function of deviation of the parameter from a predetermined condition, and a detector for generating a fluid signal having an amplitude and sense which is a function of said further fluid signal and an output device to maintain the further signal at a prescribed frequency.

---

The present invention relates to pure fluid systems and, more particularly, to a pure fluid speed control system and novel components thereof. This application is a division of my copending application Ser. No. 293,108 filed July 5, 1963 now Pat. No. 3,292,648.

It is an object of the present invention to provide a pure fluid speed control system in which a tuning fork reference and a valve which controls the speed of the device to be controlled are the only two moving parts in the entire control system.

It is another object of the present invention to provide a tuning fork reference for a speed control system wherein fluid is employed to drive the tuning fork and wherein the tuning fork reacts upon the driving fluid to develop therein a frequency reference signal in the form of a flow parameter modulation of the driving fluid.

It is another object of the present invention to provide a pure fluid speed control system in which variations of the speed of the device to be controlled appear as a frequency modulated fluid signal and wherein a pure fluid discriminator circuit provides a pressure differential signal for controlling speed of the device.

It is still another object of the present invention to utilize a pure fluid lead-lag stabilizing network to provide a rate of speed deviation pressure differential signal along with a speed deviation pressure differential signal.

It is still another object of the present invention to provide a pressure-to-flow converter system which system is responsive to a pressure signal indicating deviation and/or rate of deviation of an apparatus from its desired speed and in which the flow signal controls a piston velocity for regulating the flow of fluid to the device to be controlled.

It is another object of the present invention to provide a pure fluid low pass filter at the output of a pure fluid frequency modulator circuit so as to eliminate unwanted modulation products.

It is yet another object of the present invention to provide a pure fluid amplifier for directly comparing the speed of rotation of a device whose speed is to be controlled against a speed reference signal derived directly from a tuning fork oscillator driven by the control fluid supplied to the fluid amplifier.

It is another object of the present invention to set a tuning fork into vibration by means of a stream of fluid and controlling the amplitude of vibration by the manner in which the fluid is supplied.

Still another object of the present invention is to provide a fluid drive system for a tuning fork in which the drive fluid also senses the movement of the fork to provide a control signal for a fluid amplifier and in which a physical arrangement of elements is provided such that the driving fluid also provides damping of the tuning fork so as to control its amplitude of vibration.

Yet another object of the present invention is to provide a piston drive for controlling a valve that regulates the speed of the ultimate device, the piston having large surface area so as to have a rapid response to small pressure changes and in which a pressure-to-flow transducer is provided to drive the piston, the arrangement providing a relatively stiff system having a natural frequency above the frequency response of the system and having a linear response of piston velocity over a large range of control pressure signals.

The above and still further objects, features and advantages of the present invention will become apparent upon consideration of the following detailed description of one specific embodiment thereof, especially when taken in conjunction with the accompanying drawings, wherein.

Figure 1:
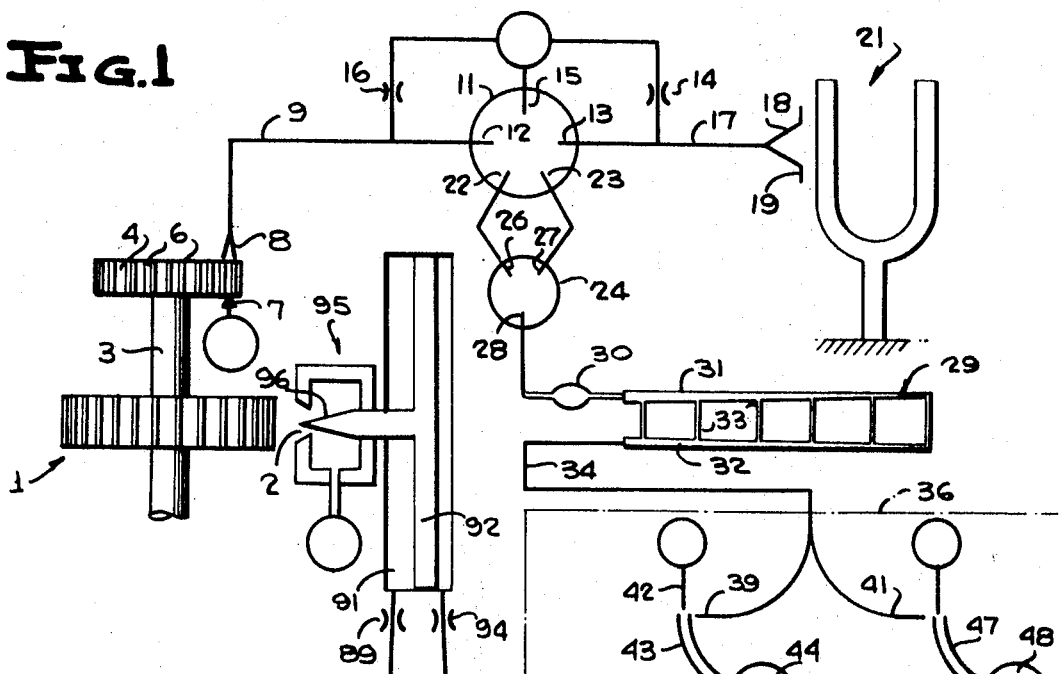
FIG. 1 is a schematic diagram of the entire system of the present invention.

Referring now specifically to FIG. 1 of the accompanying drawings, there is illustrated a schematic flow diagram of the entire system of the present invention. As previously indicated, the object of the present invention is to control the speed of an apparatus. In the particular example under consideration, the speed or rate of rotation of a turbine is to be controlled although it is to be understood that the speed of any device may be controlled in a manner similar to that illustrated. The only change required to adapt the system illustrated to a different type of device would be in the final control element.

A steam turbine 1 is caused to rotate as a result of steam issued through a variable orifice 2 which will be described in more detail subsequently. The turbine 1 is mounted for rotation with a shaft 3 and carried on the shaft 3 is a toothed wheel 4. Teeth 6 on the wheel 4 are adapted to pass between a fluid-issuing nozzle 7 and a fluid-issuing nozzle 8. The nozzle 7 is connected to a suitable source of pressure and issues a stream which is interrupted by the teeth 6 as they rotate with the turbine 1. It is apparent that the rate at which teeth 6 intercept the stream 7 is a direct function of the rate of rotation of the turbine 1.

The nozzle 8 is connected via suitable tubing or a fluid passage 9 to a pure fluid analog amplifier 11, the tubing or passage 9 being connected to a control signal nozzle 12 of the amplifier 11. The amplifier may be of a variety of types and reference may be made to patent application Ser. No. 286,309, filed June 7, 1963, by D. Roland Jones, and now Pat. No. 3,279,488, for Analog Amplifier Cross Vent. The amplifier 11 may be employed with or without the cross vent.

The amplifier 11 is provided with a second control nozzle 13 connected to P+ via a flow restrictor 14. The control orifice 12 is also connected to the P+ source via a flow restrictor, restrictor 16. The control orifice 13 is further connected via a conduit 17 to a nozzle 18 which terminates in an annulus 19. The annulus 19 is disposed at right angles to the conduit 17 and is generally parallel to the adjacent leg of a tuning fork 21 which serves as a speed reference for the apparatus of the invention.

The restrictors 14 and 16 and conduits 9 and 17 are chosen such that when the stream 7 is blocked and the tuning fork 21 is at zero displacement the pressures in the conduits 9 and 17 are the same and equal quantities of fluid issue from nozzles 12 and 13 into the amplifier 11. A power stream, issued by a power nozzle 15 of the amplifier 11, is undeflected and divides equally between output channels 22 and 23 of the amplifier 11. However, when flow out through the nozzle 8 or nozzle 18 is restricted and therefore reduced, flow through the associated control orifice 12 or 13 is increased tending to deflect the stream away from the increased flow. Flow from the nozzle 8 is restricted whenever fluid from the nozzle 7 impinges thereon and, in consequence, flow from the control nozzle 12 increases and decreases at a frequency determined by the rate of rotation of the turbine 1. Flow from the nozzle 18 is restricted as the adjacent leg of the tuning fork approaches during each cycle of vibration of the fork and, in consequence, flow from the control nozzle 13 increases and decreases at a frequency determined by the natural frequency of vibration of the tuning fork. Thus, two frequencies are introduced into the amplifier 11 for purposes of comparison.

Returning for the moment to the tuning fork 21, a danger in driving the fork with pressurized fluid is that the fork 21 may well go into undamped vibration and be damaged. In accordance with another feature of the invention, the driving fluid is supplied such that damping of the fork is achieved and controlled vibrations are maintained. More specifically, the utilization of the annulus 19 causes a reverse or negative pressure to be developed across the adjacent leg of the fork during a portion of the cycle so that the single supply both drives and damps the fork. When the fork is very close to the nozzle, the pressure in the channel 17 rises and a relatively large force is developed tending to move the fork away. As the fork moves away, the pressure of the fluid begins to drop due to increased flow through restrictor 14, and at the same time, the high velocity of the air exhausting between the fork and the annulus 19 produces a large drop in pressure in this region. The pressure in this region actually drops below ambient in that a reverse force is developed on the fork, thus producing damping in the system and control of the amplitude of oscillation. In consequence, the flow from nozzle 18 supplies the energy to the system necessary to sustain oscillation while the use of the annulus 19 produces a counteracting force over a portion of each cycle which prevents excessive amplitude of oscillation.

Returning to the operation of amplifier 11, as previously indicated, the main power stream issued into the analog amplifier 11 is deflected as a function of the rate at which the stream from the nozzle 7 is interrupted and the frequency at which the tuning fork 21 is vibrated. The effect of fluids issuing from orifices 12 and 13 on the power stream is actually a subtractive effect; that is, the deflection which would be produced by flow from the nozzle 12 is reduced to the extent that fluid issues from the nozzle 13. The vibrations of the leg of the tuning fork 21 adjacent the diverging portion 18 of the conduit 17 is a cosine function and, for purposes of analysis, the signal produced at the output channels 22 and 23 of the analog amplifier 11 may be considered to be the result of subtraction of two cosine waves from one another. The general formula for subtraction of two cosine functions is illustrated in Equation 1 below:

$$\cos \theta - \cos \phi = -2 \sin \tfrac{1}{2}(\theta+\phi) \cdot \sin \tfrac{1}{2}(\theta-\phi) \quad (1)$$

It will be noted that, in one case, the sine is equal to the sum of the two frequencies divided by two and the other term is equal to the sine of the difference between the two frequencies divided by two. For purposes of illustration only, let it be assumed that the tuning fork vibrates at 840 cycles per second and that the fluid flowing to the receptor 8 is pulsed at 800 cycles per second when the turbine 1 is running at its desired speed. Thus, the sum and difference between the frequency of the two signals when the turbine is operating at proper speed are 1640 and 40 cycles per second, respectively. The output signal produced is equal to one-half of these quantities and the two terms present in the output signal are 820 cycles per second and 20 cycles per second when the rate of rotation of the turbine is at the desired value.

It should be noted that the teeth 6 on the wheel 4 are normally of such a shape that they do not produce sine wave variations but generally produce square to trapezoidal functions. Such functions contain the basic frequency plus higher harmonics thereof. The harmonics thus introduced result in frequencies displaced above 40 cycles per second sufficiently to be readily filtered out so as not to affect the operation of the system.

The signals appearing in the output channels 22 and 23 are now applied to two input orifices of a full-wave rectifier 24. The input orifices, which are designated by reference numerals 26 and 27, direct their streams of fluid to a single output channel 28 so that the pulses applied by the input orifices 26 and 27 are combined serially to produce a train of positive pulses in the output channel 28. The rectifier is, as will be explained more fully subsequently, a maximum pressure device so that the fluid pressure in the output channel 28 is at all times equal to the maximum fluid pressure received from either of the input channels 26 or 27. Thus, considering the situation where two out-of-phase sine waves are developed in the output channels 22 and 23 and assuming that the initial excursion of the pressure in channel 22 is positive, during the first half cycle of the sine waves the fluid pressure in the outlet tube 28 is a direct function of the fluid pressure in the channel 22. During the second half of the cycle, however, the fluid pressure in the tube 28 is a function of the fluid pressure applied to the nozzle 27 from the channel 23. Thus, the pattern of the fluid pressure in the outlet channel 28 during any single cycle is equal to positive peaks equal to twice the frequency developed in either of the output channels 22 or 23. The initial difference between the frequency of the signals, 40 cycles per second when the turbine 1 is at correct speed, is re-established by the full wave rectifier.

It can also be seen that, as the speed of the turbine 1 changes, the difference between the frequencies of the signals produced by tuning fork 21 and toothed wheel 6 varies as a direct function of the speed of the turbine 1 and the frequency of the signal in the outlet channel 28 varies as a function of the deviation of the turbine from its desired speed. Thus the elements described, the peripheral control equipment and the full wave rectifier which is composed of the amplifier 11, and the maximum signal selector 24, constitute a frequency modulation circuit in which the frequency varies as the error between the desired speed of the turbine 1 and its actual speed.

The signal appearing in the channel 28 is fed through a capacitor 30 to a ladder filter 29 which operates as a low pass filter. The filter comprises a first fluid passage 31, a second fluid passage 32 parallel to the fluid passage 31, and a plurality of relatively narrow fluid passages 33 extending generally perpendicular to the passages 31 and 32 and interconnect these passages. The passages 33 are made sufficiently narrow to serve as fluid inertances as well as fluid resistances. At low frequencies, the pressure drop in the passages 33 is quite small since the impedance of the fluid inertances at low frequencies is known to be small. Consequently, substantially all of the low frequency energy in the signals applied to the output channel 28 is coupled via the channels 33 to the channel 32 and thence to an output channel 34. At the high frequencies, however, the channels 31 are sufficiently narrow that the impedance of the inertances is considerable and a large pressure drop is effected across each of these channels so that the high frequency signals are greatly attenuated. It will be noted also that the channels 31 and 32 are tapered and terminate in regions which are about as narrow as the cross-over regions; that is, the channels 33. This is done to minimize reflections of the high frequency signals, there being substantially no reflection of low frequency signals since these signals are passed almost completely through the filter.

The arrangement including capacitor 30 and ladder filter 29 comprises an RLC filter tuned to a frequency somewhat above the desired operating frequency of 40 cycles per second; for instance, 60 cycles per second. The capacitor 30 provides the capacitive component of the system and the cross members 33 supply the resistive and inductive components. A filter of this type provides a 40 db per decade increase in impedance above the frequency to which the filter is tuned.

The resistance imparted to the system by the members 33 determines the response of the circuit at the frequency to which it is tuned. The effect is measured in terms of damping factors, and damping factors of 0.3 to 0.6 are found to be acceptable. At a damping factor of 0.3, the circuit does not produce any peak in its frequency response curve but just slopes off into a 40 db per decade decline. At a damping factor of 0.6, some peaking is evident. This produces a less uniform response at various frequencies but provides a sharper discontinuity in response at the upper limit of the pass band.

The length and cross-sectional area of the elements 33 determines their resistance and the inertance. The cross-sectional area has a greater effect on resistance to flow than length so that once the values of inductance and capacitance are chosen, as determined by the tuned frequency of the filter, the length and cross-sectional area of the elements 33 may be selected to provide the resistance necessary to produce the desired damping factor.

In an RLC filter, the inductive element may constitute a single narrow and relatively long passage. Thus, the output channel 28 would feed through the capacitor 30 and a single narrow and long channel to the channel 34. However, it is found that the circuit rings at frequencies well above the frequency to which the filter is tuned. This effect is overcome in accordance with the present invention by employing the ladder filter construction illustrated.

The ladder arrangement comprises a sonic filter which is effective in breaking up the wave front of a signal during its transfer from channel 31 to channel 32 through the channels 33 if the wave length of the signal is large compared to the length of the filter; that is, channels 31 and 32. The length (L) of the channels is related to a "break frequency" ($f$) which is chosen to be below the lowest frequency at which ringing will occur as follows:

$$TC = \frac{L}{2\pi f} = \frac{2 \cdot L}{v} \qquad (2)$$

and solving for L $$L = \frac{v}{4\pi f} \qquad (3)$$

where $v$ is the velocity of sound in the fluid medium employed and TC is the time constant of the filter. If, as in the present case, the medium is air and the "break frequency" is 150 cycles per second, L is equal to approximately 6.5 inches. Very little degradation of signal occurs under 150 cycles per second but, starting at about this frequency, the amplitude of the signal in the channel 34 begins to fall off rapidly.

The number of elements 33 determines the effectiveness of the filter. If the entire region between the ends of the channels 31 and 32 were filled with elements 33 arranged side-by-side, maximum effect would be achieved; that is, the wave front would be substantially completely disrupted if its frequency is above the break frequency. It is found, however, that excellent results are achieved with fewer cross elements and the designer has a wide range of choices in this area depending upon the degree of sonic filtering desired.

It should be noted that, in certain instances where the db per decade requirements may be relaxed, say to 20 db per decade, the capacitor may be eliminated. In such a case, the RLC filter now becomes a simple RL filter. The characteristics of the sonic filter remain unchanged and the frequency at which signal attenuation commences may be made substantially as in the RLC filter. In the RL filter, attenuation of signals as a function of frequency is primarily attributable to the increase in the inductive resistance to flow which increases with frequency of the signals.

It is apparent from the above description that the ladder network 29 produces little attenuation of the low frequency signals, and great attenuation of the high frequency signals. Relating these two frequency ranges to the apparatus of the present invention, the frequency-modulated signals which are in a band of frequency centered about 40 cycles per second are passed with substantially no attenuation by the filter 29. The frequencies centered about 1640 cycles and actually all signals above about 70 to 80 cycles per second are greatly attenuated and to all intents and purposes are eliminated from the circuit.

The frequency modulated signals appearing in the channel 34 are applied to a frequency discriminator 36 which produces a differential signal across two output channels, passages 37 and 38, that is a function of the frequency of the signal appearing on the lead 34. The differential signal appears as a steady state differential in pressure. If the frequency of the signal on lead 34 is other than 40 cycles, the difference signal between the discriminator output channels 37 and 38 varies in polarity and magnitude as a function of the direction and extent of deviation of frequency.

Upon entering the discriminator 36, the conduit 34 is branched to supply, equally, two lines 39 and 41. The branch or line 39 terminates in a nozzle which issues a stream of fluid so as to divert a further stream of fluid issued by a power nozzle 42 from a receptor channel 43. The channel 43 is relatively long and narrow and terminates in a fluid tank 44. The line 43 constitutes a fluid inertance while the tank 44 constitutes a fluid capacitor. The elements 43 and 44 taken together constitute a series resonant circuit, resonant at a frequency below 40 cycles per second.

The conduit 41 is adapted to divert fluid away from a passage 47 in exactly the same manner as the fluid issuing from the conduit 39 diverts fluid from the passage 43. The passage 47 is also long and narrow to provide a fluid inertance which terminates in a fluid capacitor 48. The elements 47 and 48 also constitute a series resonant circuit but its resonant frequency is higher than 40 cycles per second.

Figure 2:
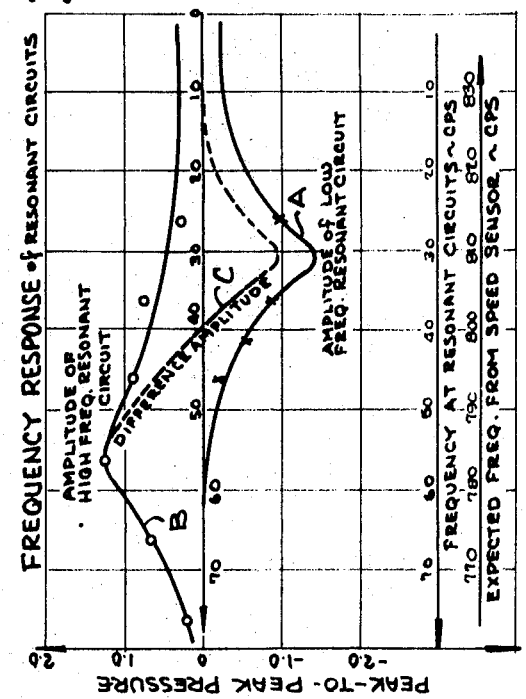
FIG. 2 illustrates several graphs defining the resonant characteristics of the resonant circuits employed in the frequency discriminator.

Referring specifically to FIG. 2 of the accompanying drawings, the series resonant circuits 43–44 and 47–48 have resonant characteristics as designated by the curves A and B, respectively. So long as the frequency of the signal appearing on the lead 34 has a frequency falling on both of the resonant characteristic curves A and B, the series resonant circuits will resonate at the frequency of the signals and at an amplitude which is determined by the characteristic curve of the resonant circuit. Thus, if the frequency of the signal on the lead 34 is 57 cycles per second in the particular embodiments illustrated, the resonant circuit 47–48 produces a signal at maximum amplitude while the resonant circuit 43–44 does not resonate appreciably and produces an average signal of substantially zero amplitude. On the other hand, if the signals appearing on lead 34 have a frequency of 32 cycles per second, the amplitude of the signals generated by resonant circuit 43–44 are at a maximum and the signals generated by the resonant circuit 47–48 are less than one-half of their maximum value. At 40 cycles per second, the amplitudes of the resonant signals generated by both of the series resonant circuits are equal so that, as will become apparent subsequently, at this frequency, the output signals on leads 37 and 38 are equal.

The circuits between series resonant circuit 47–48 and the output lead 38 are identical with those between the series resonant circuit 43–44 and the output lead 37. In consequence, only the latter circuits are described.

Output signals are derived from the series resonant circuit 43–44 on a conduit 51, the signals being taken from the junction of the inertance 43 and capacitor 44 where maximum signals are known to occur in a series resonant circuit. Conduit 51 is connected to a first control orifice 52 of an analog amplifier 53 having a second control orifice 54. The control orifice 54 is supplied with a bias signal from a pressure source via a pressure dropping restriction 56. The amplifier 53 is provided with two output channels 57 and 58. The amplifier 53 is also provided with a center output channel 59 which merely dumps fluid signals applied thereto.

The bias pressure on the nozzle 54 is approximately equal to the pressure level about which the oscillator signals applied to the nozzle 52 oscillate so that, as signals pass through their quiescent zero level, all of the fluid is directed to the center or dump passage 59. Deviations of the signal level above and below the quiescent level cause the power stream to be partially diverted to the channels 57 and 58, respectively. The amount of fluid diverted at any instant to one of the channels 57 or 58 is a function of the amplitude of the oscillatory frequency which, as indicated above, is a function of the signal frequency.

The output channels 57 and 58 are connected to a maximum pressure selector 61 and thence through a restrictive orifice 62, serving as a fluid resistor, to a fluid capacitor 63. The amplifier 53 and the maximum signal selector 61 compose a full wave rectifier. The resistor 62 and capacitor 63 are employed as a filter network so that a steady state pressure is developed in the capacitor 63 which is a function of the amplitude of the oscillatory voltage developed in the passage 51. The operation of the right half of the discriminator is identical with the operation described immediately above for the left half thereof, so that, except for the difference in the resonant characteristic, the steady state output voltage developed on the lead 38 is a direct function of the frequency on the lead 34. At 40 cycles per second, the pressures on the leads 37 and 38 are equal. Upon deviation of the frequency from 40 cycles per second, the pressure differential across the leads 37 and 38 varies as indicated by curve C of FIG. 2.

The leads 37 and 38 are connected to opposite control orifices 64 and 66, respectively, of an analog fluid amplifier 67, connected to operate as a lead-lag compensation network generally designated by the reference numeral 68. The lead-lag compensating network is employed to enhance the response of the system to sudden deviations of the turbine from its desired speed so as to rapidly institute a strong correction function into the system. This effect is achieved by employing a high gain amplifier employing negative feedback to reduce the response of the system to the lower frequency components. It is desired to have a reduced response to the slower; that is, longer term deviations from the control point so as to minimize hunting. It is apparent that a slow drift in speed produces relatively low frequency changes in the signal. However, if a large load is suddenly placed on the turbine, and the speed suddenly begins to drop or conversely, if a large load is removed, the turbine's speed suddenly begins to rise, high frequency components are generated and appear across the lines 37 and 38. Since a change in speed requires a large control signal and a rapid response to the control signal to prevent the change from becoming too great, the amplifier 67 must be a high gain device. Actually, although the amplifier is illustrated as a single amplifier, several stages of amplification are employed to provide the desired gain. On the other hand, a slow drift from desired speed should not produce a large signal since, if it did, overcompensation would occur and severe hunting would be introduced. In order to enhance the high frequency components, a high gain amplifier has been employed while negative feedback is employed to reduce the response of the high gain amplifier to low frequencies. More specifically, the amplifier 67 is provided with output channels 69 and 71. The channel 69 is connected via a fluid resistor or restriction 72 to a tank or capacitor 73 which is connected in turn through a further fluid resistor 74 to the control orifice 64a of the amplifier. Similarly, the output channel 71 is connected via fluid resistor 76 to a fluid capacitor 77 and thence through a further fluid resistor 78 to the control orifice 66a of the amplifier 67.

Each of these two circuits, for instance, the circuit including the elements 76, 77 and 78, constitutes a negative feedback channel as more fully disclosed in Patent No. 3,024,805 to Billy M. Horton for Negative Feedback Fluid Amplifier. More specifically, if the power stream is initially equally divided between the channels 69 and 71 and, for instance, a signal is applied to the orifice 66, then the fluid stream is deflected so that a larger proportion goes to the output channel 69. If this signal is fed back through the negative feedback channel 72, 73, 74, fluid issues from a control orifice 64a and decreases the amount of deflection of the main stream caused by flow issuing from the control orifice 66. Thus, since the deflection is decreased, negative feedback is provided. The feedback circuits comprising 72, 73, 74 on the one hand, and 76, 77, 78 on the other, prevent negative feedback at high frequencies since the system cannot respond to the high frequency components due to the time constant of the resistor-capacitor circuits. On the other hand, since the low frequencies have long time constants, the circuits can respond to the lower frequency components. Thus, negative feedback is instituted for the lower frequency components but does not appear in the system for the higher frequency components.

The fluid signals appearing in output channels 69 and 71 are conveyed via fluid passages 79 and 81, respectively, to opposed control orifices 82 and 83, respectively, of a fluid twin "and" unit 84. The unit is illustrated in detail in FIG. 3 of the accompanying drawings and is described in detail in co-pending patent application Ser. No. 261,180 filed Feb. 26, 1963, now Patent No. 3,240,220 in the name of D. Roland Jones and assigned to the present assignee. In the present invention, the apparatus is not employed as a twin "and" unit but is employed in a pressure-to-flow converter as a device for producing an output pressure proportional to the square of the input pressure.

The twin "and" unit 84 is provided with a first output channel 86 and a second output channel 87. The channel 86 is connected via a fluid passage 88 and thence through a fluid restriction 89 to a chamber 91 in which is located a piston 92. The output channel 87 is connected via a fluid conduit 93 and via a restriction 94 into the chamber 91 on the side of the piston 92 opposite from where the passage 89 enters the chamber. The piston carries a needle 96 of a needle valve 95 which varies the orifice 2 through which the fluid for driving the turbine 1 flows.

Thus, as viewed in FIG. 1 as the piston 92 moves towards the left, the orifice 2 is increasingly closed, reducing the flow through the valve 95 and reducing the driving force applied to the turbine, permitting its speed to reduce. If the piston is moved to the right, then the needle 96 is withdrawn, the size of the orifice 2 is increased, the amount of driving fluid applied to the turbine 1 is increased, and its speed is increased.

It is important that the piston and valve system be stiff so that the apparatus has a good frequency response and a natural frequency of vibration which is well above the frequency of operation of the system. In order to provide a piston drive system which is stiff, it is necessary to employ a piston having a short stroke and a large surface area. It is quite apparent that with the large surface area on the piston, if high pressures were employed or applied to one side of the piston in the chamber 91, the piston would be rapidly accelerated to one extreme position or the other producing overcompensation and resulting in severe instability of the system. In consequence, the system is designed to provide for small differentials in pressure across the piston. Further, the velocity of the piston during a change in control position must vary linearly with the difference in pressures at the control orifices of the fluid twin "and" unit 84 to maintain a constant gain in a stable system.

The system characteristics as set out above require conversion of the variable pressure signals to fluid flow signals which are proportional to the input pressure applied to the input of the twin "and" unit 84. The unit 84 is designed so that its output pressure is equal to the square of the input pressure thereto. The flow restrictors 89 and 94, which in this particular case are orifices, are designed by conventional techniques to provide an output flow proportional to the square root of the pressure applied thereacross. Consequently, the flow is proportional to the square root of the input pressure squared or, simplifying, proportional to the input pressure. It is possible in the present system to employ flow signals to control the piston, since only very small differentials in pressure are required to move the piston 92 as a result of its large surface area. The pressure drop across the piston may be quite low compared to the pressure drop across the orifices. In one case, the ratio of these pressure drops was 100 to 1 although greater ratios may be obtained by appropriate design. As a result of this large ratio, the system between the orifices 89 and 94 appears as a low-resistance flow system. Whenever fluid flows out of one orifice 89 or 94, it readily flows into the other orifice 94 or 89, the movement of the piston 92 producing the flow out of chamber 91 in the latter case.

Figure 3:
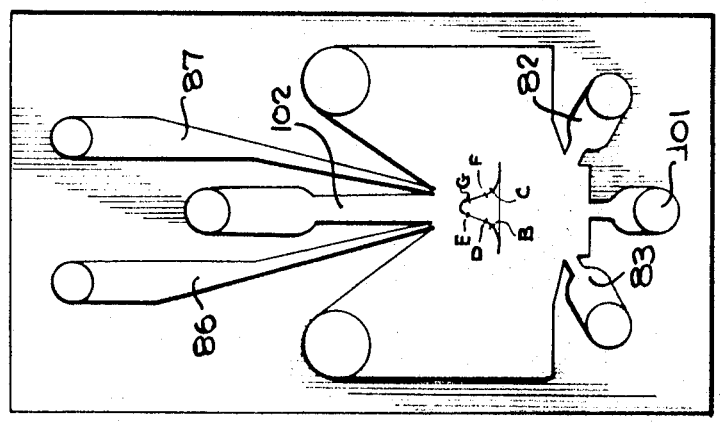
FIG. 3 is a diagram illustrating a twin "and" unit employed in the pressure-to-flow converter of the present invention.

The control of in-flow and out-flow to the chamber 91 and the pressure squaring function is, in the present invention, achieved by means of the twin "and" unit 84 and reference is now made more specifically to FIG. 3 of the accompanying drawings. The apparatus 84 is provided with a power nozzle 101 which issues fluid into a relatively wide outlet passage 102 which is axially aligned with the power nozzle 101. Disposed on opposite sides of the power nozzles are control nozzles 82 and 83. It will be noted that the left and right output channels 86 and 87 are provided with openings that are quite small relative to the distance therebetween as established by the width of the outlet channel 102. A curve A is drawn in FIG. 3 in the region between the power nozzle 101 and the outlet passages 86, 87 and 102. The curve A represents the pressure distribution the stream as a function of location relative to the center of the stream. The stream is indicated as centered in the device with the portion of the stream between points B and C entering the central outlet passage 102. The regions of the curve A between the points D and E and F and G are reasonably linear and the more usually fluid amplifier directs these regions to the output passages so that output signals very linearly with input signals. In the present case, the linear regions are not employed but exponential regions of the curves lying between the outer extremities of the stream and the points D and F are utilized. It will be noted that the entry orifices to the outlet passages 86 and 87 lie in the middle of the exponential regions so that deflection of the stream produces an exponential decrease in pressure in one outlet passage and an exponential increase in pressure in the other outlet passage. Thus, the output signal is a square function of the input signal as required in the system. The flow of fluid into the channels 86 and 87 is quite small when the stream is centered in the apparatus and equal low pressures are developed on opposite sides of the piston 92 in the chamber 91. The pressure gain of the device 84, illustrated in FIG. 3, is indicated by the exponential curve A in FIG. 4 and it is noted that changes in the direction of the main stream produce changes in the pressure presented to the openings to channels 86 and 87, increasing the pressure in one and decreasing the pressure in the other. Thus, the unit 84 introduces fluid into one channel and withdraws fluid from the other, thereby establishing the necessary conditions for the flow system. The large area of the piston imparts the desired "stiffness"; that is, resistance to undesired movement of the piston due to overshoot or outside forces. This is due to the fact that small movements of the large surface produce large changes in pressure in a sense which resists movement not commanded by the pressure applied to the piston by the control system.

Figure 4:
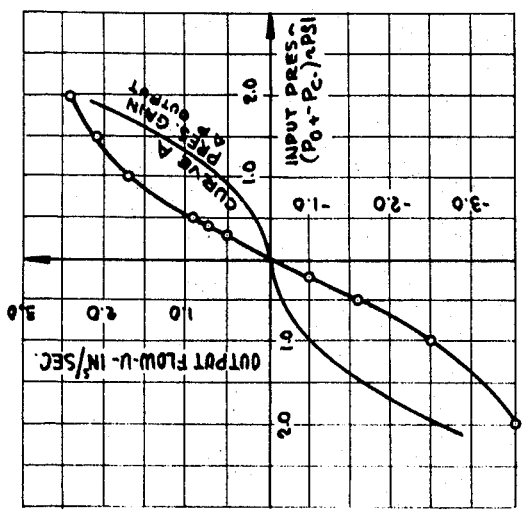
FIG. 4 is a series of graphs illustrating the input and output characteristics of the pressure-to-flow converter of the present invention.

The flow versus pressure function of the pressure-to-flow converter is illustrated as Curve B in FIG. 4 where the ordinate is flow into and out of (+ and −) the chamber 91 and the input pressure is the differential in pressure across the control nozzles 82 and 83.

As previously indicated, the full wave rectifiers include maximum pressure selector devices such as units 24 and 61 in that the pressure in the output channel is always substantially the same as the pressure of the maximum input signal applied. Thus, if two sine waves are applied to the two input nozzles of the device, as is the case in the apparatus of the invention, and the two sine waves are 180° out of phase, then the output pressure is at any time always equal to the positive or higher amplitude signal so that as oscillations continue first one and then the other pressure signal provides the single output signal.

Figure 5:
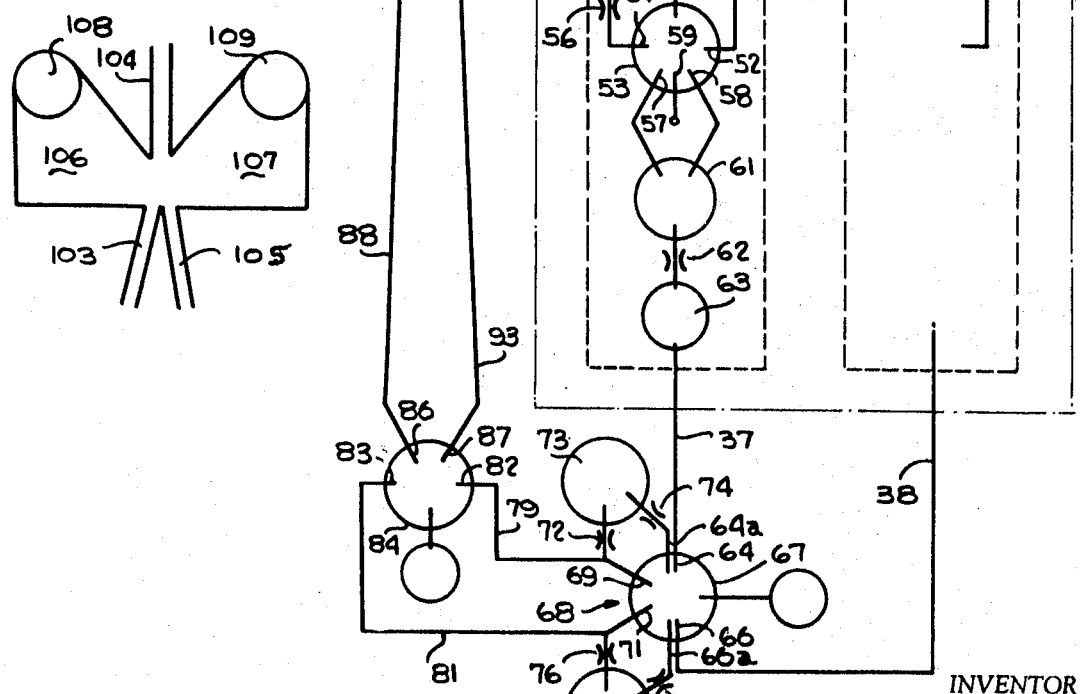
FIG. 5 is a schematic diagram of a maximum pressure selector employed as a rectifier in the present invention.

Referring now specifically to FIG. 5 of the accompanying drawings, there is illustrated a device capable of performing the full wave functions of the apparatus of FIG. 1. The apparatus is provided with two input passages 103 and 105, respectively. A single output passage 104 is provided and each passage 103 and 105 is aimed directly at the passage 104. Thus, if fluid flows only to 103, the passage 104 sees only the passage 103. Likewise, if fluid is supplied only to the passage 105, the outlet passage 104 sees only the passage 105. The enlarged regions 106 and 107 are provided on opposite sides of the outlet passage 104 and are connected via apertures 108 and 109, respectively, to atmosphere so that the entire system operates at ambient pressure.

It will be noted that the spacing between the apertures 103 and 105 on the one hand, and the outlet passage 104 on the other, is relatively small being maintained within a few widths of the passages 103 and 105. It has been found that with the arrangement illustrated and maintaining the specific limitations enumerated; that is, the aiming of the passages 103 and 105 towards the passage 104, the limited spacing between these elements and the maintenance of the regions on the opposite sides of the stream at ambient pressure, the pressure in the outlet passage 104 is maintained approximately equal to and proportional to the highest pressure in either of the passages 103 and 105. The pressure is not equal to the sum of the two pressures but is substantially equal at all times to the maximum of the two pressures presented.

While I have described and illustrated one specific embodiment of my invention, it will be clear that variations of the details of construction which are specifically illustrated and described may be resorted to without departing from the true spirit and scope of the invention as defined in the appended claims.

I claim:

1. A fluid control system comprising first means for generating a first fluid signal having a frequency component which varies as a function of a parameter of a device to be controlled, second means for establishing a second fluid signal having a fixed frequency, means for combining said fluid signals to produce a further fluid signal whose frequency varies as a function of deviation of said parameter from a predetermined condition, detector means for generating a fluid signal having an amplitude and sense which is a function of said further fluid signal and output means responsive to the fluid signal generated by said detector means for controlling said parameter of said device to maintain said further fluid signal at a prescribed frequency.

2. The combination according to claim 1 wherein said second means comprises a tuning fork, a nozzle disposed adjacent to and adapted to issue a stream of fluid against a side of a leg of said tuning fork, a surface disposed about said nozzle adjacent said side of said tuning fork, the spacing between said surface and said tuning fork being such during a portion of each cycle of oscillation that fluid flow therebetween creates a pressure opposed to the pressure of fluid issued by said nozzle.

3. The combination according to claim 1 wherein said second means comprises a tuning fork, a nozzle disposed adjacent to and adapted to issue a stream of fluid against a side of a leg of said tuning fork, a large flat member disposed about said nozzle adjacent said side of said tuning fork, the spacing between said member and said tuning fork being such during a portion of each cycle of oscillation that fluid flow therebetween creates a pressure opposed to the pressure of fluid issued by said nozzle, a fluid resistor, means for supplying fluid under pressure through said fluid resistor to said nozzle, and means for sensing pressure variations at a location between said fluid resistor and said nozzle.

4. The combination according to claim 3 wherein said first means comprises a second fluid resistor, a second nozzle, means for supplying fluid under pressure to said second nozzle through said second fluid resistor, means for varying the impedance to flow from said second nozzle at a frequency which is a function of the parameter to be controlled, a fluid amplifier having a pair of output channels, means for issuing a fluid stream toward said output channels and a pair of opposed control nozzles and means for connecting a region between each fluid resistor and its associated nozzle to a different one of said control nozzles.

5. The combination according to claim 1 wherein said means for combining comprises a pure fluid analog amplifier having a power nozzle, a pair of opposed control nozzles and a pair of output channels, means for applying said first and said second fluid signals each to a different one of said control nozzles, a pure fluid rectifier having an output channel and a pair of input channels and means connecting each of said output channels to a different one of said input channels of said rectifier.

6. The combination according to claim 5 further comprising a pure fluid low pass filter, means connecting said low pass filter between said rectifier and said detector means.

7. The combination according to claim 6 wherein said low pass filter comprises an input conduit, an output conduit and a large plurality of interconnecting channels, said interconnecting channels having a length and cross-sectional area such that frequencies of at least twice the highest of the low frequency signals generated by said means for combining are highly attenuated by said low pass filter.

8. The combination according to claim 7 wherein said input and output conduits have a large cross-sectional area at one end and taper to approximately the cross-sectional area of said interconnecting channels at said other end.

9. The combination according to claim 6 wherein said low pass filter comprises an RLC filter where R, L and C designate resistive, inductive and capacitive elements, respectively, and a sonic filter, said R and L elements included in said sonic filter.

10. The combination according to claim 9 wherein said R and L elements comprise a plurality of relatively narrow channels, a pair of spaced relatively long channels interconnected by said plurality of channels, the length ($l$) of said long channels being determined as follows $$l = \frac{v}{4\pi f}$$

where $v$ is the velocity of sound waves in the fluid medium employed and $f$ is approximately the frequency at which said sonic filter becomes effective to attenuate the signals applied thereto.

11. The combination according to claim 1 wherein said output means comprises a chamber, a piston having a large surface area relative to its stroke disposed in said chamber, and means connected between said detector means and said chamber for applying fluid flow signals concurrently to both sides of said piston which signals are a function of fluid pressure signals generated by said detector means.

12. The combination according to claim 1 wherein said detector means develops across a pair of output channels a variable differential pressure signal as a function of deviation from a prescribed value of said parameter to be controlled, and wherein said output means comprises a chamber, a piston disposed in said chamber, said piston having a large surface area relative to its stroke and a pressure-to-flow converter disposed between said detector means and said chamber so as to control fluid flow into and out of the regions in said chamber on both sides of said piston in proportion to said differential pressure.

13. A fluid control system comprising first means for generating a first fluid signal having a frequency component which varies as a function of a predetermined parameter, second means for establishing a second fluid signal having a fixed frequency, means for combining said fluid signals to produce a further fluid signal whose frequency varies as a function of deviation of said parameter from a predetermined condition, and detector means for generating a fluid signal having an amplitude and sense which is a function of said further fluid signal.

14. A fluid-operated error sensing circuit comprising sensor means for generating first fluid signals having a frequency representing the monitored value of a control system variable, resonant means in communication with said sensor means for generating second fluid signals representing the monitored value of the control system variable as a function of two resonant frequencies of said resonant means wherein the two resonant frequencies define a predetermined range of values of the control system variable, and a fluid amplifier device having a power fluid inlet, two control fluid inlets and two power fluid outlets, a first and second of said control fluid inlets in communication with said resonant means, said fluid amplifier device providing fluid output signals at said power fluid outlets indicative of the deviation of the control system variable from a desired value thereof wherein the desired value is represented by a frequency intermediate the two resonant frequencies, said fluid amplifier device having no mechanical moving parts thereby avoiding frictional wear and providing highly reliable circuit operation.

15. A fluid-operated error sensing ciricuit comprising sensor means for generating first fluid signals having a frequency representing the monitored value of a control system variable, a pair of tuned resonant devices in communication with said sensor means for generating a pair of second fluid signals representing the monitored value of the control system variable as a function of two resonant frequencies of said resonant devices wherein the two resonant frequencies define a predetermined range of values of the control system variable, and a fluid amplifier device having a power fluid inlet, two control fluid inlets and two power fluid outlets, a first and second of said control fluid inlets in communication respectively with a first and second of said pair of resonant devices, said fluid amplifier device providing fluid output signals at said power fluid outlets indicative of the deviation of the control system variable from a desired value thereof wherein the desired value is defined by a frequency intermediate the two resonant frequencies, said fluid amplifier device having no mechanical moving parts thereby avoiding frictional wear and providing highly reliable circuit operation.

16. A fluid-operated error sensing circuit comprising sensor means provided with two fluid outlets for generating a pair of first fluid signals having a frequency representing the monitored value of a control system variable, a pair of tuned resonant devices, each said resonant device provided with two vibration inducing fluid inlets and a vibration responsive fluid outlet, a first of said two fluid inlets of each said resonant device in communication respectively with a first and second of the two fluid outlets of said sensor means, a first and second of said resonant devices tuned respectively to a first and second resonant frequency wherein the resonant frequencies define a predetermined range of values of the control system variable, and a fluid amplifier device having a power fluid inlet, two control fluid inlets and two power fluid outlets, a first and second of said control fluid inlets in communication respectively with the fluid outlets associated with said first and second resonant devices, said fluid amplifier device providing fluid output signals at said power fluid outlets indicative of the deviation of the control system variable from a desired value thereof wherein the desired value is defined by a frequency intermediate the two resonant frequencies.

17. A fluid-operated error sensing circuit comprising sensor means provided with a pair of fluid outlets for generating a pair of 180° phase displaced pressurized fluid signals having a frequency representing the monitored value of a control system variable, a pair of tuned resonant vibrating members, each said resonant member provided with a pair of fluid inlets and a vibration responsive fluid outlet, a first and second of said pair of resonant members tuned respectively to a first and second resonant frequency wherein the two resonant frequencies define a predetermined range of values of the control system variable, a first fluid inlet of each said pair of fluid inlets in communication with said first and second of the fluid outlets of said sensor means whereby fluid signals provided within the vibration responsive fluid outlets represent the monitored value of the control system variable as a function of the two resonant frequencies, and a fluid amplifier device having a power fluid inlet, two control fluid inlets and two power fluid outlets, a first and second of the control fluid inlets in communication respectively with the vibration responsive fluid outlets of said first and second resonant members whereby said fluid amplifier device provides pressurized fluid output signals at said power fluid outlets indicative of the deviation of the control system variable from a desired value thereof wherein the desired value is defined by a frequency intermediate the two resonant frequencies.

18. A fluid control system for maintaining a desired value of a selected system parameter comprising a fluid amplifier comprising a first fluid passage terminating in a first fluid flow restrictor for generating a main fluid jet to be controlled, a pair of fluid receiver means downstream from said first restrictor for receiving fluid from the main jet, and a pair of second fluid passages terminating in oppositely disposed second fluid flow restrictors for generating control fluid jets to controllably deflect the main jet relative to said receiver means, first means in fluid communication with the input to a first of said second fluid passages for generating a first pulsating flow of control fluid having a magnitude of flow responsive to deviations of said system parameter above the desired value, second means in fluid communication with the input to a second of said fluid passages for generating a second pulsating flow of control fluid having a magnitude of flow responsive to deviations of said system parameter below the desired value, and means in fluid communication with said receiver means for restoring said system parameter to the desired value.

19. A fluid control system for maintaining a desired value of a particular system parameter comprising a fluid amplifier comprising a first fluid passage terminating in a first nozzle for generating a power jet of fluid to be controlled, a pair of fluid receiver means downstream from said first nozzle for receiving fluid from the power jet, and a pair of second fluid passages terminating in a pair of oppositely disposed second nozzles for generating jets of control fluid to controllably deflect the power jet relative to said receiver means, first means for generating a pulsating flow of said control fluid wherein the frequency of pulsation is proportional to the magnitude of said system parameter, second means for controlling the magnitude of said pulsating control fluid flow, said second means comprising a first frequency sensitive fluid impedance responsive to deviations of said system parameter above the desired value, the output of said first impedance being connected to the input of a first of said second fluid passage, and a second frequency sensitive fluid impedance responsive to deviations of said system parameter below the desired value, the output of said second impedance being connected to the input of a second of said second fluid passages, and means in fluid communication with said receiver means for restoring said system parameter to the desired value.

20. A fluid control system for maintaining a desired magnitude of a particular system parameter comprising a fluid amplifier comprising a first fluid passage terminating in a first nozzle for generating a power jet of fluid to be controlled, a pair of fluid receiver means downstream from said first nozzle for receiving fluid from the power jet, and a pair of second fluid passages terminating in a pair of oppositely disposed second nozzles for generating jets of control fluid to controllably deflect the power jet relative to said receiver means, means for generating a pulsating flow of said control fluid wherein the frequency of pulsation is proportional to the magnitude of the system parameter, a first fluid impedance resonant at a frequency above a selected frequency, said selected frequency representing the desired magnitude of the system parameter, a second fluid impedance resonant at a frequency below said selected frequency, the input to said first and second fluid impedance being connected to the output of said pulsating control fluid generating means, the output of said first and second fluid impedance being connected respectively to an input of a first and second of said second fluid passages whereby said jets of control fluid have magnitudes of control fluid flow determined by deviation of the frequency of pulsation of control fluid flow from said selected frequency, and means in fluid communication with said receiver means for restoring said system parameter to the desired magnitude.

21. A regulating system for controlling a first system variable, comprising detection means for sensing a variation in said first system variable and producing a change in a second system variable in response thereto, oscillating fluid amplifier means operably connected to said detection means and arranged to undergo a change of oscillation frequency upon a change in said second system variable caused by a change of said first system variable, fluid operated converter means connected to said oscillating fluid amplifier means for receiving said frequency change, fluid driven regulating means, and said fluid operated digital to analogue converter means operably arranged to provide an analogue output pressure in proportion to said received oscillation frequency change for driving said fluid driven regulating means and thereby controlling said first system variable.

References Cited

UNITED STATES PATENTS

| | | | |
|---|---|---|---|
| 2,042,374 | 5/1936 | Wunsch et al. | 91—3 X |
| 3,260,271 | 7/1966 | Katz | 137—81.5 X |
| 3,302,398 | 2/1967 | Taplin et al. | 137—81.5 X |

CARROLL B. DORITY, Jr., Primary Examiner

U.S. Cl. X.R.

91—3; 137—81.5